Patented Aug. 9, 1949

2,478,170

UNITED STATES PATENT OFFICE 2,478,170

LOW-METHOXYL PECTINS AND PROCESS FOR THEIR PREPARATION

William Dayton Maclay and Rolland M. Mc-Cready, Berkeley, Calif., assignors to the United States of America as represented by the Secretary of Agriculture No Drawing. Application March 7, 1945, Serial No. 581,543

10 Claims. (Cl. 260—209.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to low-methoxyl pectins (pectinic acids) and has among its objects the preparation by simplified methods of such pectinic materials for use in forming low-sugar gels of high gel strength and good texture with milk and certain fruit and vegetable juices without the addition of calcium ion, and with other fruit and vegetable juices, and water, with the addition of calcium ion.

The following definitions of terms as used herein are given: By "pectin" is meant the familiar preparation of commerce or of the laboratory, prepared from plant extracts by precipitation with alcohol, acetone, or metallic salts, with no attempt to modify its natural methoxy content. By "pectic acid" is meant a more or less completely demethoxylated pectin. "By pectinic acid" is meant any one of a series of derivatives of pectin with methoxy content intermediate between that of pectin and pectic acid. In the present application, the term "pectinic acid" is used generically to indicate either the acid itself or its salts.

Low-methoxyl pectins can be prepared by the partial deesterification of either pectin or protopectin, such deesterification being catalyzed by acid, alkali, or enzyme.

Alkaline deesterification has generally been allowed to proceed to completion to yield salts of pectic acid. Pectin has also been treated with various alkalis to produce low-methoxyl pectins which, when used to prepare high-sugar jellies, increase the time of set of these jellies. In addition, pectin solutions have been treated with calcium hydroxide until gelation occurred and by this method were able to form high-sugar jellies at a pH of 7 (neutrality) and above (alkalinity). Furthermore, alkaline hydrolysis has been used to produce pectins which, when used as jellying agents in high-sugar jellies, lowered their setting temperatures. In this latter method, however, the produced pectins had 50% to 60% of their acid groups still esterified.

Normally, high-methoxyl pectins contain about 11% to 12% methoxyl, which represents about 80% or more of the acid groups esterified. Therefore, when 50% to 60% of the acid groups of such a pectin remain esterified, its methoxyl content will be about from 6.9% to 7.5%. This is the normal range of methoxyl content found in commercial slow-set, high-sugar jellying pectins.

Low-methoxyl pectins prepared according to the invention have about from 20% to 30% of the acid groups remaining esterified, this representing a methoxyl content of about from 2.6% to about 4.5%. Gelation by this type of low-methoxyl pectin is brought about by the addition of calcium ion, with or without sugar, and is not dependent on high (about 50% to about 60%) concentration of the sugar for gelation, as is the case with the low-methoxyl pectins produced in the prior art. Also, the controlled conditions of the invention, using a temperature range of about from 12° C. to 15° C., while varying the time of reaction to produce the desired product, differs from the conditions of the prior art.

In the invention, alkali is used as the deesterifying agent. The use of alkaline reagents, such as alkali metal hydroxides, ammonium hydroxide, sodium carbonate, organic ammonium bases, etc., have the advantages of rapid rate of reaction, ease of control, low cost of agent, and low cost of equipment as compared with acid deesterification.

According to the invention, an aqueous pectin solution or pectin extract is adjusted to a temperature of about 35° C. or lower, preferably within a range about from 12° C. to 15° C. A solution of a strong alkali, such as potassium or sodium hydroxide is then added, the while keeping the temperature constant, to bring the pectin solution to an alkaline pH of about 10 to 12, after which the addition of alkali is continued at such a rate as to maintain the pH and until such time as the amount of alkali, previously determined, has been added to yield a low-methoxyl pectin (pectinic acid) of desired methoxyl content. Or, a quantity of a weak alkali, such as ammonium hydroxide or sodium carbonate sufficient to bring the pH of the pectin solution to the desired alkalinity and maintain it at that pH throughout the reaction period, is added at one time, with stirring.

At such time when the methoxyl content of the pectin has been reduced to the desired amount, as measured by the amount of strong alkali added, or by the time necessary for the weak alkalis to act, the reaction mixture is acidified to a pH of approximately 4 by the addition of acid, and the pectinic acid then isolated by precipitation with alcohol or other methods of pectin isolation known to the trade.

The following examples are illustrative of the invention.

Example I

To 1,000 ml. of 1% pectin (185-grade commercial citrus, methoxyl content of 9.0%, centipoise viscosity of 15.3 at 25° C.) solution at about 15° C. was added 100 ml. of 2 N sodium carbonate to adjust the pH of the solution to about 10.5. The reaction mixture was so maintained at 15° C. for a period of about 4 hours, after which it was acidified to a pH of about 3.5. The low-methoxyl product was precipitated by pouring into an equal volume of alcohol, isolated by pressing through cheesecloth, hardened in 95% ethyl alcohol, dried and ground.

The product obtained was found to have a methoxyl content of 2.7% and a viscosity of 6.3 centipoises (1% solution at 25° C.).

Example II

To 4,000 ml. of 1% pectin (185-grade commercial citrus, methoxyl content of 9.0%, centipoise viscosity of 15.3 at 25° C.) solution at 15° C. was added 0.5 N sodium hydroxide with stirring, to adjust the pH of the solution to about 11.0. The reaction mixture was maintained at about 15° C. and about pH 11.0 during the continuous addition of 142 ml. of 0.5 N sodium hydroxide over a period of about 80 minutes. The solution was then acidified to a pH of about 3.5 and the product isolated in the same manner as that described in Example I.

The product obtained was found to have a low methoxyl content of 3.5 and a centipoise viscosity of 12.8 at 25° C.

Example III

To 10 liters of 4% pectin (178-grade commercial citrus, methoxyl content of 9.5%, centipoise viscosity of 17.3 at 25° C.) at about 15° C. was added 460 ml. of concentrated ammonium hyroxide, with stirring, to bring the pH of the reaction mixture to about 10.7. The reaction mixture was maintained at about 15° C. for about 2.25 hours and the pectin then precipitated with 12 liters of 95% ethyl alcohol containing 500 ml. of concentrated hydrochloric acid. The precipitated low-methoxyl pectin was recovered by pressing with cheesecloth. It was then washed in 50% ethyl alcohol to which was added sufficient ammonium hydroxide to bring the resultant mixture to a pH of about 3.9. The product was recovered, hardened by treating with 7 liters of 95% ethyl alcohol, pressed, dried, and ground.

The product obtained was found to have a methoxyl content of 3.7% and a viscosity of 10.2 centipoises (1% solution at 25° C.).

Example IV

Reaction conditions were the same as in Example III. The low-methoxyl pectin was precipitated by adding 400 ml. of 25% aluminum chloride solution and the resulting solution adjusted to a pH of about from 4.2 to 4.4 through the addition of sodium carbonate. The precipitate was then dewatered by pressing through cheesecloth and the aluminum removed from the pectin in the following manner: The aluminum-pectin precipitate was added to 2,400 ml. of 75% ethyl alcohol containing 5%, by volume, of sulfuric acid and allowed to swell for a very short time. This was followed by the addition of a like volume of acidified 75% ethyl alcohol. The resulting pectin suspension was stirred for 15 minutes, filtered, the pectin resuspended in 3,600 ml. of 50% ethyl alcohol containing 5% by volume of sulfuric acid, stirred for 15 minutes, and the suspension again filtered. The pectin was again suspended in 50% ethyl alcohol, the solution neutralized to a pH of approximately 4 through the addition of 50% ethyl alcohol containing 5.6% ammonium hydroxide by volume, filtered, and the pectin resuspended in 95% alcohol. The resultant pectin suspension was filtered, and the pectin dried and ground.

The product obtained was found to have a methoxyl content of 3.7% and a viscosity of 10.2 centipoises (1% solution at 25° C.).

Example V

To 4,000 ml. of an approximate 1% pectin solution obtained from thinly sliced fresh lemon peel, at about 15° C., was added 150 ml. of concentrated ammonium hydroxide to adjust the pH of the reaction mixture to about 10.6. The reaction mixture was maintained at about 15° C. for about 4½ hours, followed by precipitation of the low-methoxyl pectin with aluminum chloride. Further precipitation and purification were carried out in the same manner as described in Example IV.

The product obtained was found to have a methoxyl content of 2.8% and a viscosity of 9.0 centipoises (1% solution at 25° C.).

Example VI

Eight hundred ml. of an approximate 2.5% pectin (grade 178) solution was precipitated by adding to a like volume of 95% ethyl alcohol. It was then pressed through cheesecloth, and suspended in 1,000 ml. of 50% alcohol. To this suspension was added 50 ml. of concentrated ammonium hydroxide to yield a pH of about 11.3, this mixture being then maintained at a temperature of about 13° C. for about 40 hours. The solution was then neutralized to a pH of about 4 with hydrochloric acid, the pectin isolated by pressing, washed successively with 50% and 95% ethyl alcohol, dried, and ground to pass 100 mesh.

The product obtained was found to have a methoxyl content of 3.1% and a centipoise viscosity of 8.0 at 25° C. in 1% solution.

Example VII

To 4,000 ml. of 1.2% pectin (commercial apple, 250-grade, methoxyl content of 11%) at about 13° C. was added 100 ml. of concentrated ammonium hydroxide to adjust the pH of the reaction mixture to about 11.0. At the end of about 1½ hours, the reaction mixture was adjusted to a pH of about 4 with hydrochloric acid and the product precipitated in 50% ethyl alcohol and isolated as described in Example I.

The product obtained was found to have a methoxyl content of 4.6% and a centipoise viscosity of 13.6 at 25° C. in 1% solution.

Example VIII

Four liters of 1% apple pectin extract, obtained by extraction of the pectin from 600 g. of dried apple pomace, was treated in the same manner as described in Example VII, except that the reaction was run at about 12° C. for about 4 hours.

The product herein obtained was found to have a methoxyl content of 2.6% and a viscosity of 5.0 centipoises (1% solution at 25° C.).

The low-methoxyl pectins obtained in the foregoing examples have methoxyl-viscosity relationships such that 35% sugar-fruit jellies and 20% sugar-milk jellies of high strength and good texture can be prepared at pH's of 2.5-3.5 and 6.5, respectively, when concentration of about 0.8% pectin is used in the former and about 0.4% pectin in the latter.

It has been found that products of excellent gelling characteristics have been made from low-methoxyl pectins prepared according to the invention from commercially prepared powdered pectins and from extracts derived from orange, lemon, and grapefruit rinds, and from apple pomace.

Various grades of pectins can be used in our invention, and the grade usable is restricted only insofar as the resultant products have a methoxyl-viscosity relationship within the limits essential to the formation of gels of high strength and good texture. Variable concentrations of pectin may be used to carry out the demethoxylation. There are marked differences in demethoxylation rates at 12° C. and 35° C., the rate being much greater at the elevated temperature. The decrease in viscosity, however, increases more rapidly with increase of temperature than does the rate of demethoxylation. It has been found, therefore, that a temperature of about from 12° C. to 15° C. should be used to obtain a product of the most desirable qualities.

At pH's appreciably below 11 and at temperatures of 15° C. or below, the rates of demethoxylation are too low to be commercially feasible. At pH's above 12, the rate of demethoxylation is so high that it is difficult to regulate the reaction. The most desirable range of pH is about between 11 and 12.

This invention is applicable to the alkaline de-esterification of pectins of different grades, methyl ester content, and from a variety of source materials. It is applicable, also, to the preparation of all low-methoxyl pectins, regardless of their initial methoxyl content, having a methyl ester-viscosity relationship which will yield gels of high strength and good texture under the conditions specified. Furthermore, it is applicable to pectin in the dissolved or swollen states.

Having thus described our invention, what is claimed is:

1. A process of preparing a low-methoxyl pectin comprising treating an aqueous solution of pectin with an alkaline reagent to give a pH of about from 10 to 12 at a temperature of about from 12° C. to 15° C., and then, while keeping the temperature constant, continuing the addition of alkaline reagent to the reaction mixture at such a rate as to maintain the pH and until such time as the amount of reagent, previously determined, has been added to yield a low-methoxyl pectin having a methoxyl content of about from 2.6% to about 4.6%.

2. A process of claim 1, wherein the alkaline reagent is an alkali metal hydroxide.

3. A process of preparing a low-methoxyl pectin comprising treating an aqueous solution of pectin at a temperature of about from 12° C. to 15° C. with a weak base added all at once in sufficient quantity, and with stirring, to give a pH of about from 10 to 12 during the entire reaction period, thereby to yield a low-methoxyl pectin having a methoxyl content of about from 2.6% to about 4.6%, and then, while keeping the temperature constant, adjusting the pH of the reaction mixture to about from 3.5 to 4.5, and finally precipitating and isolating the low-methoxyl pectin.

4. The process of claim 3, wherein the weak base is ammonium hydroxide.

5. The process of claim 3, wherein the weak base is sodium carbonate.

6. A process comprising subjecting a solution of pectin at a pH of about from 10 to 12 to a temperature of about from 12° C. to 15° C. to produce a low-methoxyl pectinic acid having a methoxyl content of about from 2.6% to about 4.6%.

7. A process comprising subjecting a solution of pectin at a pH of about from 10 to 12 to a temperature of about from 12° C. to 15° C. to produce a low-methoxyl pectinic acid having a methoxyl content of about from 2.6% to about 4.6%, and then isolating the low-methoxyl pectinic acid.

8. A process comprising subjecting an aqueous alcohol suspension of pectin at a pH of about from 10 to 12 to a temperature of about from 12° C. to 15° C. to produce a low-methoxyl pectinic acid having a methoxyl content of about from 2.6% to about 4.6%.

9. An alkali-deesterified pectinic acid having a methoxyl content of about from 2.6% to about 4.6% produced by the process of claim 6.

10. A salt of an alkali-deesterified pectinic acid having a methoxyl content of about from 2.6% to about 4.6% produced by the process of claim 6.

WILLIAM DAYTON MACLAY.
ROLLAND M. McCREADY.

REFERENCES CITED

The following references are of record in the file of this patent:

UNITED STATES PATENTS

| Number | Name | Date |
| --- | --- | --- |
| 2,133,273 | Cox | Oct. 18, 1938 |
| 2,253,389 | Mnookin | Aug. 19, 1941 |
| 2,358,430 | Willaman | Sept. 19, 1944 |